United States Patent [19]

Nalle, Jr.

[11] 3,844,874

[45] Oct. 29, 1974

[54] OVERLAPPING RIBBON MESH AND METHOD THEREFOR

[76] Inventor: George S. Nalle, Jr., 108 West 2nd St., Austin, Tex. 78701

[22] Filed: Nov. 29, 1972

[21] Appl. No.: 310,539

Related U.S. Application Data

[60] Continuation of Ser. No. 101,816, Dec. 28, 1970, abandoned, which is a division of Ser. No. 761,142, Sept. 20, 1968, Pat. No. 3,560,306.

[52] U.S. Cl..................... 161/57, 161/89, 161/109, 161/112, 161/143, 161/177, 161/DIG. 6, 156/65, 264/DIG. 81
[51] Int. Cl.............................................. B32b 5/12
[58] Field of Search ........ 156/65; 52/173, 551, 553; 160/231, 237; 161/57, 58, 86, 88, 89, 91, 39, 109, 110, 111, 112, 113, 140, 141, 142, 143, 150, 177, DIG. 6; 264/DIG. 81

[56] References Cited
UNITED STATES PATENTS

| | | | |
|---|---|---|---|
| 2,492,909 | 12/1949 | Warp | 161/142 |
| 2,862,551 | 12/1958 | Smythe | 160/231 R |
| 3,238,683 | 3/1966 | Maxwell | 161/DIG. 6 |
| 3,392,229 | 7/1968 | Rabus | 161/38 |
| 3,703,432 | 11/1972 | Koski | 161/110 |

Primary Examiner—George F. Lesmes
Assistant Examiner—William R. Dixon, Jr.
Attorney, Agent, or Firm—Arnold, White & Durkee

[57] ABSTRACT

A plastic mesh product having a series of overlapping ribbons is formed by bonding such plastic ribbons with a second set of plastic filaments as the ribbons and filaments extrude from relatively rotating dies. The ribbonlike filaments are extruded from orifices so positioned that only a portion of the width of the ribbon is bonded to the second filaments thus producing a plastic product with overlapping ribbons having a "fish scale" character.

8 Claims, 7 Drawing Figures

OVERLAPPING RIBBON MESH AND METHOD THEREFOR

RELATED APPLICATIONS

This application is a continuation of copending application Ser. No. 101,816, filed Dec. 28, 1970, entitled "Overlapping Ribbon Mesh and Method Therefor," now abandoned, which in turn was a division of application Ser. No. 761,142, filed Sept. 20, 1968, and entitled "Apparatus for Making Overlapping Ribbon Mesh," now U.S. Pat. No. 3,560,306.

BACKGROUND

The present invention relates to a novel plastic mesh product and to method and apparatus for producing the same. More particularly, this invention relates to a novel overlapping ribbonlike plastic mesh and to the method and die apparatus for producing such a mesh.

Various prior art methods and apparatus are known for producing plastic mesh by extrusion of hot plastics from relatively rotating dies. The products resulting from such prior art methods are netlike in character and are produced by bonding two sets of filaments extruding from relatively rotating dies at the intersections of the filaments.

Such net products are useful in many packaging and decorative applications. However, such mesh products because of their open mesh character are not opaque and permit, when used in packaging, the contents of the package to be seen.

In providing packages for various foodstuffs, particularly when the foodstuffs are designed to both be packaged and cooked in the same bag, it is sometimes desirable to provide a container which will permit passage of water so as to allow cooking, and yet is opaque so that the contents of the package will not be readily visible. Particularly, in the case of rice, the opaqueness of such a bag to contain and cook the rice would be an advantage, since many forms of rice in uncooked condition do not have a pleasing white appearance, although they assume such an appearance after cooking.

The plastic mesh products of the prior art typically comprise one group of parallel filaments intersecting another group of parallel filaments. To provide an opaque container, it would be necessary to produce a louvered effect requiring not only that one group of filaments be ribbonlike but also that they be made to overlap, the overlapping edge being non-bonded to allow fluids to circulate through the mesh. To effect such a product, it therefore becomes necessary to bond only a portion of the width of the ribbonlike filament at the intersection with the other group of filaments. Accordingly, this invention provides a novel plastic mesh product having a series of overlapping ribbonlike filaments which are unbonded at their overlapping ends to thus provide a louvered mesh.

There is further provided in accordance of this invention, a novel method of extruding such a mesh from two relatively rotating circular dies.

Further in accordance with this invention, there is provided a novel extrusion apparatus having a die assembly with orifices specifically designed for producing such an overlapping ribbon mesh product.

Plastic mesh of the character produced by this invention can be rendered opaque by suitable pigmentation. Also, such a mesh product with overlapping ribbons will repel water directed at it from certain angles and yet will permit air to circulate therethrough. Consequently, these products can also be used in rainwear and in other applications where it is desirable to repel water or liquid and permit passage of air or gas through the mesh.

It will further be appreciated that such a ribbon-mesh product can be used for decorative purposes in a variety of applications. In addition, the flat ribbons provide surfaces on which labels can be printed directly on the mesh product.

SUMMARY OF THE INVENTION

In accordance with the first aspect of this invention, there is provided a novel extruded plastic mesh product having a first group of ribbonlike filaments and a second group of plastic filaments disposed crosswise to the first group and bonded to the ribbonlike filaments at the intersections between the two sets of filaments. Only a portion of the width of each of the ribbonlike filaments is bonded to the filaments of the second set while the remaining portion of the ribbon is unbonded and forms an overlapping edge thus allowing air or fluids to circulate through the mesh.

It will be apparent herein that when the term "filament" is used, reference is had to extruded plastic filamentous products having any cross-sectional shape which may be, for example, circular, rectangular or ribbonlike, elipsoidal, tubular with hollow cross section, or the like. The formation of said filaments is well known in the art.

In accordance with the second aspect of this invention, a novel method is provided for forming such a mesh product from an extrudable plastic by extruding two groups of plastic filaments. The first group of plastic filaments is extruded from a circular series of orifices in the first die, and the second group from a circular group of orifices in a second die concentric with the first. The filaments of at least one of said groups are ribbonlike in character and are extruded in such a manner that one edge of the ribbon is closer to the other group of filaments than is the other edge of the ribbon. As both sets are extruded, the dies are moved relative to each other so that as the filaments from each set intersect, bonding occurs only across a portion of the width of the ribbonlike filament.

In accordance with the third aspect of this invention, a novel plastic mesh extrusion apparatus is provided having two rotatable concentric die plates defining a miter line therebetween. Each of the die plates has circular series of extrusion orifices with discharge openings near the miter line. The discharge openings in at least one of the die plates are elongated and are disposed at an angle to the miter line to produce a ribbonlike extrusion product wherein one of the edges of the ribbon is nearer to the miter line than the other edge. The edge of the ribbonlike filament more remote from the miter line hence will not enter into bonding contact with the filaments being extruded from the first die and enable the production of an overlapping ribbon product. The length of each of the elongated discharge openings which form the ribbonlike products is usually sufficient to provide ribbons wide enough to overlap the next subsequent ribbon being extruded, this contributing the overlapped character to the ultimate product.

BRIEF DESCRIPTION OF THE DRAWINGS

The instant invention will be more explicitly understood with reference to the accompanying drawings which illustrate specific embodiments in accordance with the invention.

DESCRIPTION OF SPECIFIC AND PREFERRED EMBODIMENTS

Figure 1:
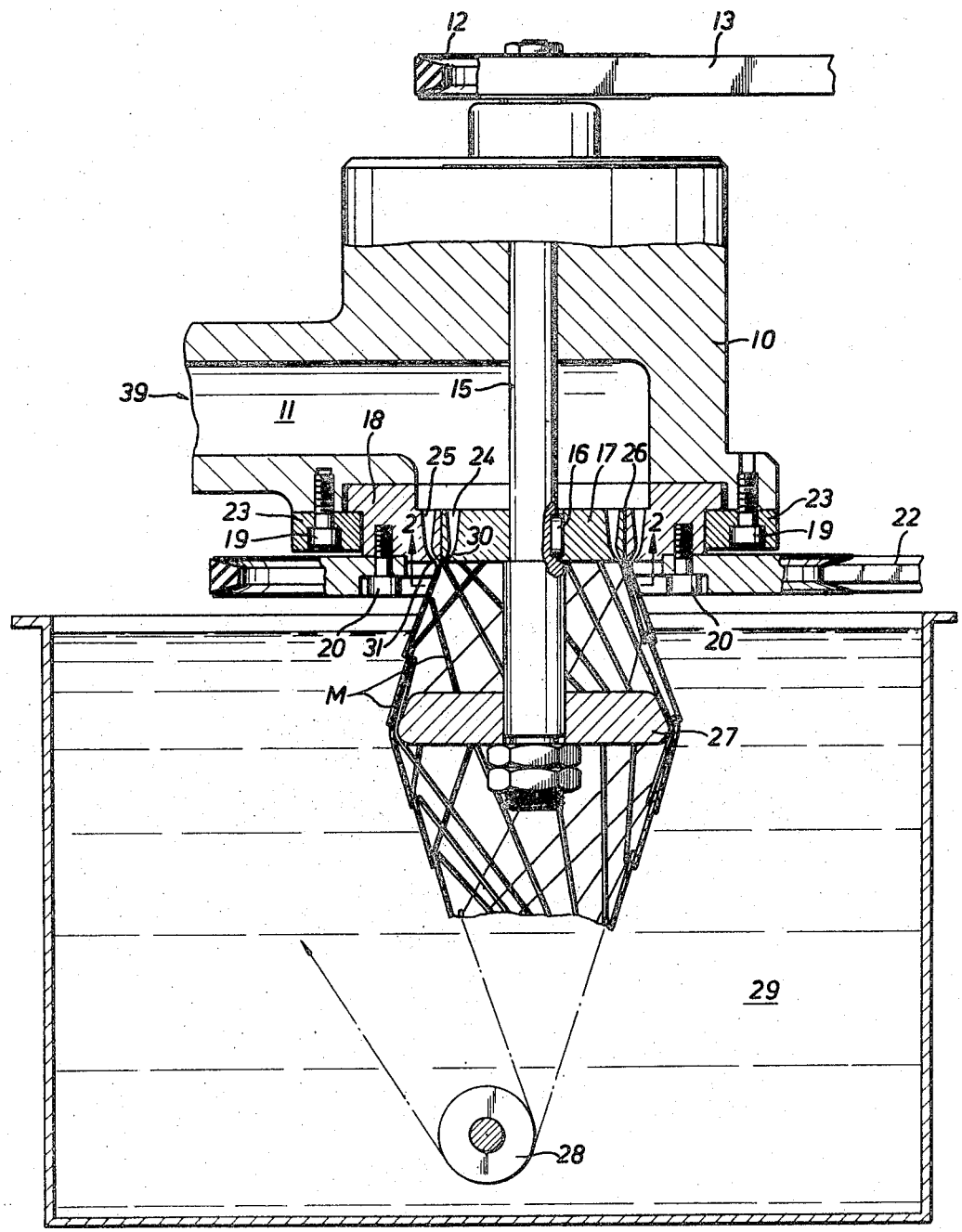
FIG. 1 is a vertical partial sectional view of a novel extrusion apparatus in accordance with an embodiment of this invention.

Referring now to FIG. 1, a plastic mesh extrusion apparatus according to one embodiment of the invention is shown partially in section. This device consists of a die body 10 located at the discharge end of a container (not shown) holding a supply of heated extrudable plastic which during operation will be under pressure from an extruder screw (not shown) or equivalent pressurizing mechanism and forced through inlet port 39 into a cavity or chamber 11. The plastic should be a suitable thermoplastic, preferably polyethylene or polypropylene, but may be, for example, a polyamide (nylon), a vinyl polymer or copolymer, an acrylic polymer or copolymer, or a cellulosic material.

A die plate assembly includes two relatively rotatable dies, inner die 17 and outer die 18, arranged concentrically, the junction of the dies defining the miter line 26. While the embodiment of FIG. 1 shows the periphery of die plate 17 fit against die plate 18, a suitable spacer may separate the two die plates. Die plate 18 is supported by a stationary mounting ring 23 removably secured by studs 19 to die body 10, while die plate 17 is removably secured to drive shaft 15 by key 16.

Figure 2:
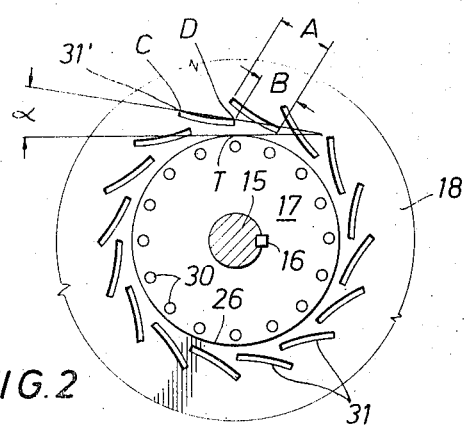
FIG. 2 is a view taken along line 2—2 of FIG. 1 showing the disposition of the extrusion orifices of the dies.
Figure 3:
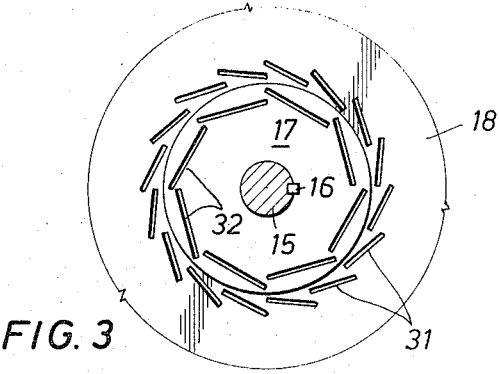
FIG. 3 shows a bottom view of an alternate die embodiment which can be used in the apparatus of FIG. 1.
Figure 4:
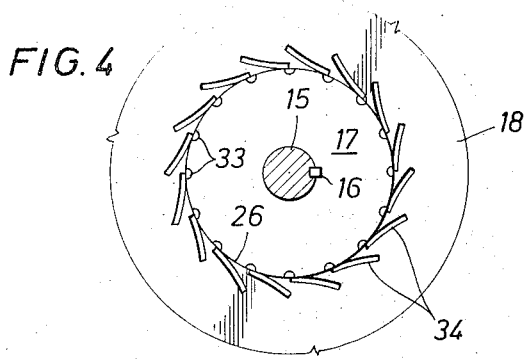
FIG. 4 shows a bottom view of still another die embodiment which can be used in the apparatus of FIG. 1.
Figure 7:
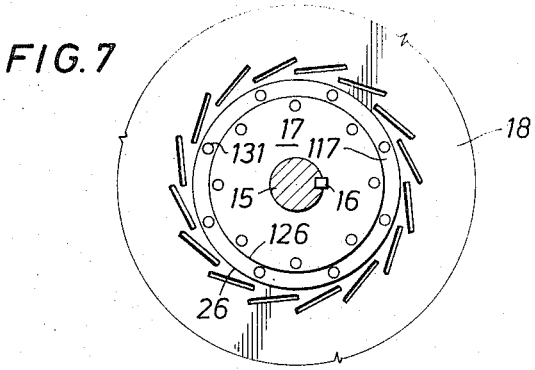
FIG. 7 shows a bottom view of a further die embodiment, which can be used in a plastic mesh forming apparatus in accordance with this invention.

Die plates 17 and 18 respectively each have circularly arranged series of extrusion orifices 24 and 25 extending therethrough, the extrusion orifices being wider at their inlet openings 24 and 25 than at their discharge openings 30 and 31 to provide efficient channeling of the hot plastic into the orifices. FIG. 2 shows the discharge side of one embodiment of the die plate assembly of FIG. 1. The extrusion orifices 24 and 25 of die plates 17 and 18 have discharge openings 30 and 31, respectively, arranged in circular series on either side of miter line 26. Outer discharge openings 31 are elongated so as to form a ribbonlike extrusion product. These elongated openings may be slightly arcuate as shown in FIGS. 2 and 4 or may be, for example, straight slits defining rectangular, openings as shown in FIGS. 3 and 7. Alternatively, the ribbon forming openings may be scalloped or otherwise adapted to produce decorative shapes. The minimal thickness of the ribbonlike filaments extruded is typically one to about 5 mils, while the width varies typically from about ½ inch to about 1 or 2 inches. The discharge openings 31 are oriented such that one end of the extruding ribbonlike filaments will be closer to miter line 26, and hence closer to the filaments extruding from openings 30, so that only a portion of the width of the ribbonlike filaments extruded from openings 31 will be brought into bonding proximity with and bonded to the threadlike filaments extruded from discharge openings 30 during operation as will be described below. It is preferred that elongated discharge openings 31 be disposed at an angle to the direction of rotation of the filament openings 30 so that the bonding of the filaments will take place across a portion of the surface of the extruding ribbon.

Thus, it is preferred that an angle of less than 90° be defined between a tangent to the miter line and a line intersecting the ends of the elongated openings 31. Such an angle $\alpha$ is shown drawn in FIG. 2 and is formed by line C D between the ends of opening 31' and the tangent to the miter line at point T, perpendicularly beneath the end of opening 31'. If angle $\alpha$ is 90° then the ribbon is being extruded perpendicular to the miter line and bonding will occur across the edge of the ribbon. As the angle $\alpha$ approaches zero, there is an increased likelihood of the filaments from openings 30 bonding entirely across the width of the ribbon. The angle $\alpha$ can be varied therefore to create products wherein the ribbon lies comparaitvely flat on the inner filaments or flares outwardly as will be obvious.

If desired, the ribbonlike filaments may be extruded from inner die plate 17 and the threadlike filaments from outer die plate 18; however, the die plate assembly embodiment of FIG. 2 is preferred thereover since the unbonded edges of ribbonlike fialments extruded therefrom have greater freedom of movement and are less likely to inadvertently bond to the mesh when said ribbons are disposed as the outermost series of extruding filaments.

During operation, sets of filaments extruded from orifices 24 and 25 move in intersecting coaxial paths when the dies are moved relative to each other, the outer path fromed by filaments extruded from outer orifices 25, defining an extrusion circle. Since discharge openings 30 and 31 are located at a distance from miter line 26, the sets of filaments intersect outside the die plates in mid air, i.e., in free space. As the filaments intersect, the plastic is still hot enough so that bonding takes place at the point of contact where intersection occurs. It is important that one end of elongated discharge openings 31 be farther from miter 26 than the other so that as the sets of filaments intersect only a portion of the width of the ribbonlike filaments extruded from discharge openings 31 intersect and bond with the threadlike filaments extruded from discharge openings 30.

Alternatively to the mid-air bonding technique described above, methods and apparatus for bonding of filaments can be used whereby the filaments intersect inside the die plate assembly at miter line 26, as shown, for example in FIG. 4. One end of the elongated openings 34 extends into the miter line 26, while the other end is remote from the miter line so that bonding occurs within the die. Again only a portion of the width of the ribbonlike filaments extruded from openings 34 intersect and are bonded to the filaments from openings 33. Either technique, bonding in the die or in mid air, can be used, but in either case, it is important to orient the elongated discharge openings 34 so that one end is closer to openings 33, and hence the filaments extruded therefrom, than the other end.

The degree of overlapping of the ribbonlike filaments is a function of the length A of the elongated discharge openings and their relative position (FIG. 2). Overlapping will always result when the length A of each elongated discharge opening is greater than the distance B between the inner edges of adjacent orifices.

Relative rotation of the die plates is necessary to form a novel mesh. Die plate 17 may rotate in either direction while die plate 18 rotates in the opposite direction, or both die plates may rotate in the same direction at different speeds, to achieve a relative movement of the die plates. Indeed, either die plate may be held stationary while the other is rotated or the die plates may be oscillated with respect to each other to produce relative movement. Any suitable means for rotating the die plates can be used, for example, referring to FIG. 1, a first drive pulley 12 is fixed to drive shaft 15 and adapted to be turned by V-belt 13 connected to a suitable power means (not shown), thereby to rotate die plate 17. A thrust bearing 14 supports drive shaft 15 and die plate 17 against the thrust of pressurized plastic. A second drive pulley 21 removably secured to die plate 18 by studs 20 is adapted to be turned by V-belt 22 connected to a suitable power means (not shown), thereby to rotate die plate 18.

A variety of patterns and shapes of plactic mesh can be produced by varying the spacing and shape of the discharge openings 30 and 31 and the method and relative speeds of rotation. For example, both series of discharge openings can be arranged to produce overlapping ribbonlike filaments, as shown in the die assembly of FIG. 3. Also, the elongated discharge openings may be, for example, curved, straight, or of a decorative shape to produce varying patterns and textures. Further, a multicolored mesh can be produced providing separate chambers in die body 10, each supplying a different colored plastic to each set of extrusion orifices. This requires establishing separate plastic supply reservoirs, one feeding the set of extrusion orifices in the outer die 18, and the second feeding the set of extrusion orifices in the inner die 17. This would be more easily achieved in a stationary die plate. Such apparatus is well known in the art as shown in U.S. Pat. No. 3,118,180 to George S. Nalle, Jr. Indeed, a different colored plastic could be supplied to each extrusion orifice in a similar manner.

Referring again to FIG. 1, a unitary tubular mesh M is produced from the novel extrusion apparatus, as described above, and allowed to set by promptly introducing the mesh into a cooling medium, such as water bath 29, or some other suitable cooling fluid, such as expanding gas. Whether bonding is performed in the die or in mid air, the hot plastic needs to be cooled fairly rapidly so that the unbonded edges of the overlapping ribbonlike filaments will not droop to contact and bond to the mesh. Indeed, when bonding takes place in the die, the mesh may be introduced directly into a cooling medium after extrusion.

A spreader or mandrel 27 is disposed in water bath 29 to stretch and size the tubular mesh a desired amount after the plastic has set. Mandrel 27 has a smooth circular periphery and is loosely mounted on shaft 15 so as to present little resistance to mesh as it is pulled thereover by any well-known mechanism which may include guide roller 28. As the mesh is pulled away from the die plate assembly after extrusion, it is important that the mesh does not form an angle with the plane of the die plates, such that the free unbonded edges of ribbonlike filaments can contact and bond to the mesh beneath the unbonded edge. Therefore, the diameter of mandrel 27 and its distance below the die plate assembly should be such that the mesh pulled thereover will not spread or flare out radially so much as to cause unwanted bonding of the free edges to the mesh. The diamter of mandrel 27, for example, may be greater than that of the extrusion circle, as shown in FIG. 1 or may be less than the extrusion circle.

However, mandrel 27 is not essential to production of the novel mesh. For example, a sizing ring or other sizing device having a diameter less than that of the extrusion circle may be substituted for mandrel 27 to reduce the radial dimension of the tubular mesh in preparation for packaging. In the case of a sizing ring through which the mesh passes, it would be preferred to extrude the ribbonlike filaments from the inner die so that the free edges of the ribbons would not be in contact with the sizing ring surface, but since welding occurs near the die, this is not essential.

Figure 5:
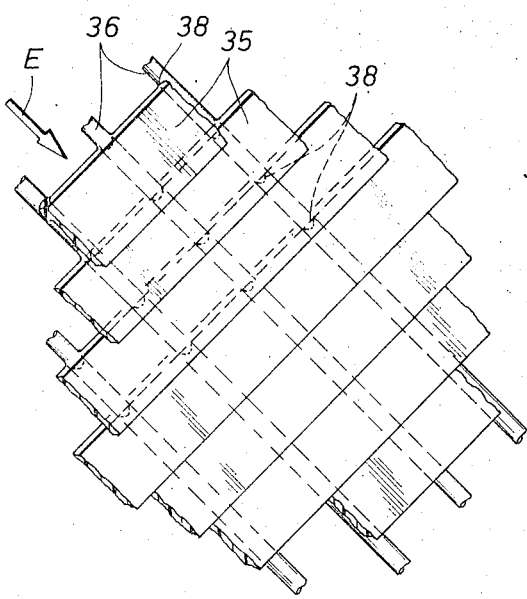
FIG. 5 is a diagrammatic perspective view showing one type of novel plastic overlapping ribbon-mesh product which is produced from the die embodiment shown in FIG. 2.

FIG. 5 shows a portion of one type of novel mesh product from the die embodiment of FIG. 2. Overlapping ribbonlike filaments 35 are bonded to intersecting nonoverlapping threadlike filaments 36 as indicated by reference numeral 38. The overlapping edges of filaments 35 are free to allow air to circulate thereunder, but repel water and other fluids directed, for example, as shown by arrow E. Further, if the plastic were opaque or were pigmented to be opaque, contents of the mesh package would not be visible since there is no open or netlike construction.

Figure 6:
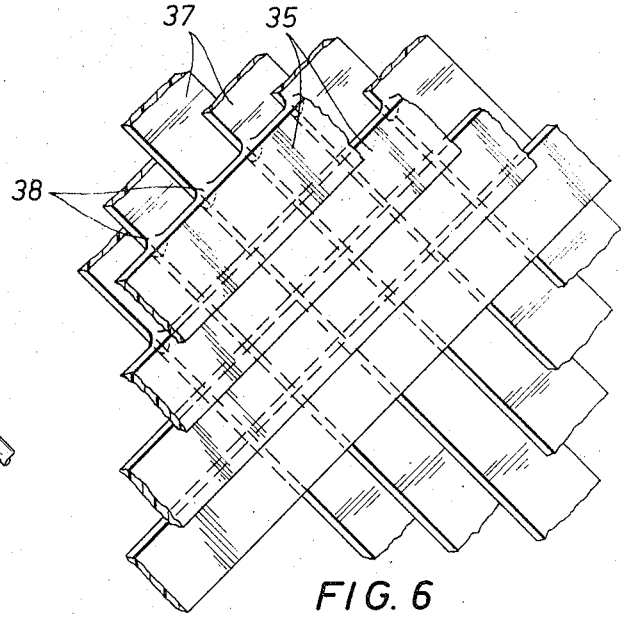
FIG. 6 is a diagrammatic perspective view showing another type of novel plastic mesh product which would be obtained from the die embodiment shown in FIG. 3.

FIG. 6 shows an example of another type of novel plastic mesh from the die embodiment of FIG. 3. Overlapping ribbonlike filaments 35 are bonded across a portion of their widths at 38 to another group of overlapping ribbonlike filaments 37. The two mesh products shown in FIGS. 5 and 6 are only examples of a variety of patterns and textures which can be produced by varying the dimensions and placement of the discharge openings of die plate 17 and 18, as explained above.

Variations in the above methods and apparatus can be indulged to produce different meshes than those embodiments disclosed. In a further example, by providing three relatively movable dies with the outermost die extruding the ribbonlike filaments, there can be produced a standard net product having outer overlapping ribbons. Such a die arrangement is shown in FIG. 7 wherein the outer die 18 contains the elongated ribbon extrusion orifices 31. The middle die 117 contains a series of filament orifices 131 and innermost die 17 contains a second series of filament orifices. The dies meet to form miter lines 26 and 126. Relative movement of dies 117 and 17 will produce a mesh product of intersecting filaments as is known in the art. The rotation of outer die 18 results in the overlaying of ribbon filaments over the net to produce an overlapping ribbon product.

The die arrangement of FIG. 7 is operated by moving the dies to create relative movement between die 18 and die 117, and also relative movement between die 117 and die 17. Thus dies 18 and 17 may be rotated clockwise with die 117 rotated counterclockwise or maintained stationary; die 117 can be maintained stationary while die 18 is rotated clockwise and 17 rotated counterclockwise; die 17 can be kept stationary while the outer two are relatively rotated. Other variations in rotation will be obvious to achieve different effects.

Variations of filament shape, filament density, and the like may be practiced with each of the die arrangements herein in accordance with this invention.

What is claimed is:

1. A plastic mesh, comprising a first group of parallel filaments forming an intersection with a second group of parallel ribbonlike filaments such that only a portion of the width of the filaments of said second group is bonded to filaments of said first group at said intersection, the spacing and width of said second group being such that the unbonded edges of the filaments of said second group overlap the bonded edges of adjacent filaments of said second group, said overlapping filaments being non-bonded to one another to allow fluids to circulate through said mesh.

2. The mesh product of claim 1 wherein said ribbonlike filaments are from about one-half inch to about two inches wide.

3. A plastic mesh according to claim 1, wherein the filaments of said first group are of a ribbonlike form, the spacing and width of the filaments of said first group being such that the unbonded edges of the filaments of said first group overlap the bonded edges of adjacent filaments of said first group, said overlapping filaments being non-bonded to one another to allow fluids to circulate through said mesh.

4. A plastic mesh according to claim 1 including a third group of parallel filaments intersecting the filaments of said first group to form an open plastic net product having the overlapping ribbonlike filaments of said second group bonded to the filaments of said first and third groups.

5. A plastic mesh according to claim 1 wherein said plastic is opaque.

6. A plastic mesh comprising a first group of parallel spaced apart plastic filaments intersecting and bonded at said intersections to a portion of each filament of a second group of spaced apart parallel ribbonlike plastic filaments, the distance between corresponding edges of adjacent ribbonlike filaments being less than the width of said ribbonlike filaments to locate said adjacent ribbonlike filaments in overlapping relation to one another, said overlapping ribbonlike filaments being non-bonded to one another to allow fluids to circulate through said mesh.

7. A plastic mesh according to claim 6 wherein each of said ribbonlike filaments defines a first plane forming an angle of less than ninety degrees with a second plane defined by said first group of filaments.

8. A plastic mesh according to claim 6 wherein the filaments of said first group are of a ribbonlike form, the distance between corresponding edges of adjacent filaments of said first group being less than the width of the filaments of said first group to locate adjacent filaments of said first group in overlapping relation to one another.

* * * * *